United States Patent Office 2,955,989
Patented Oct. 11, 1960

2,955,989

DISTILLATION OF ESTERS

William A. Dimler, Jr., Colonia, and Joseph A. Mountain, Newark, N.J., assignors to Esso Research and Engineering Company, a corporation of Delaware No Drawing. Filed Mar. 28, 1958, Ser. No. 724,523

5 Claims. (Cl. 202—57)

This invention relates to an improved method for the distillation of esters whereby degradation of the ester is minimized or eliminated. More specifically, this invention relates to the use of alumina during the distillation of esters derived from alcohols and dicarboxylic acids.

It is well known that esters of dicarboxylic acids are made by reacting about two moles of alcohol with the selected dicarboxylic acid either under thermal conditions or in the presence of an acid catalyst such as sulfuric or toluene sulfonic acid. The crude ester product is then caustic washed to remove any acid ester present and to remove other acidic compounds. This is a requisite since the specifications for pure ester especially useful as plasticizers require a low acid number, i.e. essentially zero. The crude ester after caustic wash must then be distilled to strip off the alcohol and other low boiling products. It is customary in the distillation of the ester to strip off the alcohol and take with it a very minor amount of the ester product in order to make sure that the remaining ester is essentially alcohol free. Since it is of course necessary to employ relatively high temperatures even under low pressure conditions, degradation product is formed. In order to separate a mixture of esters, for example, a mixture containing dihexyl phthalate, hexyl decyl phthalate and didecyl phthalate, it is necessary to distill at higher temperatures resulting in degradation of product. In some cases it is also desirable to take the total ester product overhead leaving a small amount of bottoms as high boiling impurities. In all cases degradation of product during distillation is a serious problem confronting ester manufacturers.

In the past, distillation of certain esters and especially those useful as plasticizers has resulted in the formation of the free acid and/or anhydride, thereby reducing the yield and causing operational difficulties in the distillation process. More specifically, when esters such as diisooctyl phthalate are distilled for purification even under reduced pressures, a substantial amount of phthalic anhydride and some phthalic acid is formed as degradation product. Some of the phthalic anhydride dissolves in the ester product but a large quantity of this degradation product sublimes or deposits on the walls of the distillation equipment causing plugging and other technical difficulties. To rid the ester product of the phthalic acid and anhydride, it has been found necessary in industry to employ certain finishing techniques which add to the cost of the final product. For example, quite conventionally after distillation, a caustic wash followed by a water wash and a drying step are employed to remove the aforesaid degradation product impurities from the ester.

It has now been found that distillation of these esters in the presence of an alumina-comprising solid eliminates or substantially minimizes degradation of the product to the acid and/or anhydride. Small amounts of alumina which may be thermally activated, i.e. 0.05 to 5 wt. percent, are sufficient to effect this stabilization during distillation, however, larger quantities of the alumina-comprising solids may be employed if desired. Since the solids, of course, do not distill over with the ester, there are no separation problems and the amount of alumina employed is so small that it may be thrown away after one or a series of distillations or, if desired, the alumina may be reactivated for additional use. If bottoms is recovered as product, separation is effected by simple filtration or the like.

The plasticizer esters to which this invention relates are well known in the art, comprising esters of various alcohols generally containing from 6 to 13 carbon atoms per molecule. Occasionally higher and lower boiling alcohols are employed. While these alcohols may be derived from any suitable source, in many current commercial ester plants, oxo alcohols are employed. These oxo alcohols are usually a mixture of various isomeric alcohols, the particular mixture depending on the specific conditions of the oxo process from which they come. The acidic reactants include a number of acids or anhydrides such as phthalic, adipic, azelaic and sebacic. Of these acidic reactants, phthalic acid and anhydride are in many cases preferred. Esters may be prepared from a single alcohol to obtain a simple ester such as diisooctyl phthalate although sometimes it is desirable to utilize the properties of more than one alcohol in the final ester product. Thus a typical mixed ester may be prepared by reacting approximately one mole of phthalic anhydride with one mole of hexyl alcohol and one mole of decyl alcohol to provide a mixed hexyl decyl phthalate ester. It is obvious that many combinations of alcohols may be employed to produce a variety of complex esters which are tailor-made for specific uses. Such combinations may include octyl decyl, octyl tridecyl, hexyl octyl, hexyl tridecyl, decyl tridecyl and the like. The particular ester whether it be a simple dialkyl type or a mixed dialkyl type does not appear to have a significant effect on the distillation other than the fact that they may boil at different temperatures. In the distillation of the above type esters the acid and anhydride degradation products are a serious problem which may be solved by resort to the use of an alumina-comprising solid.

In accordance with this invention the ester is preferably distilled under sub-atmospheric conditions since many of these products are high boiling and many tend to degrade further if distilled at their atmospheric boiling point temperatures. Typical low distillation pressures are between 0.5 to 200 mm. Hg to minimize degradation of product. Even under these low pressure conditions in the absence of alumina, up to about 10% acid and anhydride degradation products are formed. Surprisingly, other active solid adsorbents such as activated carbon do not inhibit the formation of degradation product.

The alumina is preferably a conventional activated type and may be employed alone or in combination with one or more other solids which are essentially inert in the distillation. For example, silica-alumina and other alumina-containing solids may be employed. Any particle size alumina may be employed.

To illustrate the problems which have been solved by this invention, the following Examples 1 and 3 record the results of a distillation process in the absence of any solid, Example 2 records the results of a distillation process in the presence of activated carbon, and the remaining examples record the results of distillation in the presence of alumina in accordance with this invention.

*Example 1*

A charge of about 345 grams of mixed phthalate esters was charged into a fractionating column having about 10 plates. The phthalate esters of the charge were in the following approximate proportions: 25% dihexyl phthalate, 50% hexyl decyl phthalate and about 25% didecyl phthalate with impurities comprising alcohol and higher molecular weight compounds. No additives were employed. Distillation was carried out under 4 mm. Hg. The phthalate esters were prepared by reacting about one mole of decyl alcohol and one mole of hexyl alcohol with one mole of phthalic anhydride in the presence of an acid catalyst and a hydrocarbon solvent. Prior to distillation, the product was caustic and water washed reducing the acid number to essentially zero. The crude phthalate mixture was then fractionated first to recover overhead at 45 to 175° C. unreacted alcohol, hydrocarbon and any other low molecular weight products present. 41 grams were taken overhead as the first cut. A second cut was started at 175° C. up to 185° C. whereupon phthalic anhydride deposited on the walls of the equipment to such an extent that the run was discontinued. Approximately 10 wt. percent of solid deposit (phthalic anhydride) based on charge was formed.

*Example 2*

Two distillations substantially in accordance with Example 1 were attempted with 0.7 and 3.5 grams of activated carbon. The results in both cases were substantially the same as in Example 1 and the runs were discontinued due to excessive deposition of phthalic anhydride on the equipment.

In Examples 1 and 2 the small amount of dihexyl phthalate recovered before the runs were terminated had high acid numbers.

*Example 3*

A crude mixture of dihexyl phthalate, hexyl decyl phthalate and didecyl phthalate 25–50–25 was fractionated at 4 mm. Hg taking the dihexyl phthalate overhead at 203 to 224° C. and the hexyl decyl phthalate overhead at 224 to 253° C. A substantial amount of phthalic anhydride deposited on the distillation equipment, but the distillation was continued. The 203–224° C. fraction had a neutralization number $$\left(\frac{\text{mg. KOH}}{\text{g.}}\right) \text{ of } 7.51$$

and the fraction taken overhead at 224–253° C. had a neutralization number of 5.03. The initial charge had a neutralization number of about 0.03. This example shows that a substantial amount of acidic degradation product probably in the form of phthalic acid and/or anhydride remains in the product taken overhead.

*Example 4*

In this example 357 grams of approximately the same composition as employed in Examples 1 and 2 was fractionated at 4 mm. Hg in the presence of 0.7 gram of activated alumina. The first cut boiling between 40–185° C. comprised 40.8 grams and was principally unreacted alcohol and hydrocarbon. The remaining phthalate ester was taken overhead at temperatures of 185–250° C. with no deposition of phthalic anhydride and/or phthalic acid on the distillation equipment. The recovered phthalate ester had a neutralization number of about zero. It is therefore apparent that alumina, even small amounts, efficiently inhibits degradation of the ester product during distillation.

What is claimed is:

1. In the distillation of dialkyl esters of dicarboxylic acids, the improvement which comprises contacting said esters with activated alumina and distilling said esters in the presence of said alumina, said alumina being present in an amount sufficient to inhibit the formation of degradation product and recovering said dialkyl esters substantially free from said alumina.

2. A process in accordance with claim 1 in which the activated alumina contains silica.

3. A process in accordance with claim 1 wherein said esters are dialkyl phthalate esters.

4. A process in accordance with claim 3 wherein said alkyl groups contain from 6 to 10 carbon atoms each.

5. In the distillation of mixed dialkyl esters of dicarboxylic acids wherein said alkyl groups contain from 6 to 13 carbon atoms each, the improvement which comprises contacting said esters with from 0.05 to 5 wt. percent of activated alumina and distilling said mixed dialkyl esters in the presence of alumina and recovering the individual dialkyl esters substantially free from alumina.

References Cited in the file of this patent
UNITED STATES PATENTS 2,776,984    Mention et al. _____ Jan. 8, 1957